US011131612B2

(12) United States Patent
Yamagata et al.

(10) Patent No.: US 11,131,612 B2
(45) Date of Patent: Sep. 28, 2021

(54) METHOD FOR ESTIMATING HARDNESS OF COLD WORKED COMPONENT AND METHOD FOR ACQUIRING HARDNESS-EQUIVALENT PLASTIC STRAIN CURVE OF STEEL MATERIAL

(71) Applicant: NIPPON STEEL CORPORATION, Tokyo (JP)

(72) Inventors: Mitsuharu Yamagata, Tokyo (JP); Nobuo Yoshikawa, Tokyo (JP); Yasushi Tsukano, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 99 days.

(21) Appl. No.: 16/493,231

(22) PCT Filed: Mar. 15, 2018

(86) PCT No.: PCT/JP2018/010309
§ 371 (c)(1),
(2) Date: Sep. 11, 2019

(87) PCT Pub. No.: WO2018/169013
PCT Pub. Date: Sep. 20, 2018

(65) Prior Publication Data
US 2020/0116608 A1    Apr. 16, 2020

(30) Foreign Application Priority Data
Mar. 16, 2017  (JP) ............................. JP2017-051005

(51) Int. Cl.
*G01N 3/08* (2006.01)
*G01N 3/40* (2006.01)
*G01N 3/42* (2006.01)

(52) U.S. Cl.
CPC ....... *G01N 3/42* (2013.01); *G01N 2203/0078* (2013.01)

(58) Field of Classification Search
CPC ............ G01N 17/00; G01N 3/08; G01N 3/40; G01N 3/00; G01N 23/203; G01N 3/42; B21D 22/26; B21D 24/00
See application file for complete search history.

(56) References Cited

U.S. PATENT DOCUMENTS 4,567,774 A * 2/1986 Manahan .................. G01N 3/00
   374/49
6,516,655 B1 * 2/2003 Adrian ..................... G01N 3/42
   73/760

(Continued)

FOREIGN PATENT DOCUMENTS

EP    2 796 221 A1    10/2014
JP    6-288884 A     10/1994
(Continued)

OTHER PUBLICATIONS

International Search Report for PCT/JP2018/010309 dated Jun. 12, 2018.

(Continued)

*Primary Examiner* — Brandi N Hopkins
(74) *Attorney, Agent, or Firm* — Birch, Stewart, Kolasch & Birch, LLP

(57) ABSTRACT

There is provided a method for estimating a hardness of a cold worked component including: preparing a test piece for hardness measurement having a dent portion of a shape corresponding to a shape of the contact surface of the punch by using a mounting base on which a test piece is mounted and a punch of which a contact surface to be in contact with the test piece is a curved surface, and compressing the test piece mounted on the mounting base using the punch; measuring hardnesses of the test piece for hardness measurement at a plurality of hardness measurement positions in a measurement direction while taking, as the measurement direction, a direction in the dent portion in which a sheet thickness changes; performing numerical analysis to calculate equivalent plastic strains of the test piece for hardness measurement, and acquiring a hardness-equivalent plastic strain curve on the basis of the hardnesses and the equivalent plastic strains at the hardness measurement positions; and specifying a hardness from the calculated value of equiva- (Continued)

lent plastic strain of an arbitrary part of the cold worked component on the basis of the hardness-equivalent plastic strain curve by performing numerical analysis to calculate a value of equivalent plastic strain of a cold worked component.

10 Claims, 8 Drawing Sheets

(56) References Cited

U.S. PATENT DOCUMENTS

| | | | |
|---|---|---|---|
| 6,718,820 B2* | 4/2004 | Kwon | G01N 3/48 73/81 |
| 2009/0177417 A1 | 7/2009 | Yonemura et al. | |
| 2013/0006543 A1 | 1/2013 | Hiwatashi et al. | |

FOREIGN PATENT DOCUMENTS

| | | |
|---|---|---|
| JP | 7-333127 A | 12/1995 |
| JP | 2005-249681 A | 9/2005 |
| JP | 2009-174886 A | 8/2009 |
| JP | 2017-138101 A | 8/2017 |
| KR | 10-1999-0051770 A | 7/1999 |
| RU | 2132544 C1 | 6/1999 |
| RU | 2434217 C1 | 11/2011 |
| RU | 2507496 C1 | 2/2014 |

OTHER PUBLICATIONS

Written Opinion of the International Searching Authority for PCT/JP2018/010309 (PCT/ISA/237) dated Jun. 12, 2018.
Machine translation of JP-7-333127-A, published on Dec. 22, 1995.
Russian Search Report, dated Mar. 12, 2020, for corresponding Russian Application No. 2019132644/28, along with an English translation.
International Preliminary Report on Patentability and English Translation of Written Opinion of the International Searching Authority for PCT/JP2018/010309 (Forms PCT/IB/373 and PCT/ISA/237).

* cited by examiner

METHOD FOR ESTIMATING HARDNESS OF COLD WORKED COMPONENT AND METHOD FOR ACQUIRING HARDNESS-EQUIVALENT PLASTIC STRAIN CURVE OF STEEL MATERIAL

TECHNICAL FIELD

The present invention relates to a method for predicting the hardness of a cold worked component and a method for acquiring a hardness-equivalent plastic strain curve of a steel material.

BACKGROUND ART

In the working of a cold worked component including sheet forging, grasping the mechanical properties of the material is important in terms of working process design. Work hardening characteristics, which are a kind of mechanical properties of a material, can be acquired on the basis of a stress-strain curve of the material; the larger the plastic strain applied to the material is, the larger the work hardening of the material is. However, when a component is molded by cold working, plastic strain in the interior of the material after cold working is not uniform, and therefore a hardness distribution occurs in the interior. Hence, a method for finding the hardness of an arbitrary part of a cold worked component with good accuracy has been desired.

For example, Patent Literature 1 discloses a method in which a dent is provided in a cylindrical test piece and a cylinder compression test is performed in a state where a liquid lubricant is put in the dent to reduce the influence of friction, and thereby a relationship between the hardness and the strain of the material is measured.

CITATION LIST

Patent Literature

Patent Literature 1: JP H7-333127A

SUMMARY OF INVENTION

Technical Problem

However, in the method of Patent Literature 1 above, the aspect ratio of the cylindrical test piece is limited in terms of preventing the buckling of the test piece during compression; if the aspect ratio of the test piece is more than 1.0, it is difficult to apply strain. Further, usually one test piece can provide only plastic strain for one amount of compression (one amount of strain); hence, to acquire plastic strain for a plurality of amounts of compression and obtain a relationship between the hardness and the strain of a material, it is necessary to perform a plurality of rounds of compression test while changing the amount of compression. Further, it is difficult to create a cylinder compression test piece from a thin steel sheet.

Thus, the present invention has been made in view of the problem mentioned above, and an object of the present invention is to provide a new and improved method for predicting the hardness of a cold worked component in which a relationship between the hardness and the strain of a material can be obtained by acquiring plastic strain for amounts of compression by one round of compression test.

Solution to Problem

According to an aspect of the present disclosure in order to achieve the above object, there is provided a method for estimating a hardness of a cold worked component including: preparing a test piece for hardness measurement having a dent portion of a shape corresponding to a shape of the contact surface of the punch by using a mounting base on which a test piece is mounted and a punch of which a contact surface to be in contact with the test piece is a curved surface, and compressing the test piece mounted on the mounting base using the punch; measuring hardnesses of the test piece for hardness measurement at a plurality of hardness measurement positions in a measurement direction while taking, as the measurement direction, a direction in the dent portion in which a sheet thickness changes; performing numerical analysis to calculate equivalent plastic strains of the test piece for hardness measurement, and acquiring a hardness-equivalent plastic strain curve on the basis of the hardnesses and the equivalent plastic strains at the hardness measurement positions; and specifying a hardness from the calculated value of equivalent plastic strain of an arbitrary part of the cold worked component on the basis of the hardness-equivalent plastic strain curve by performing numerical analysis to calculate a value of equivalent plastic strain of a cold worked component.

The test piece may be in a flat sheet-like shape.

The test piece for hardness measurement may be created by compressing the test piece by means of the punch in a state where the test piece is restrained in a sheet width direction.

The test piece for hardness measurement may be created so as to have a strain distribution including a strain region larger than uniform elongation obtained in a uniaxial tensile test.

The test piece for hardness measurement may be created so as to have a strain distribution including a strain region where equivalent plastic strain is more than 1.0.

The hardness measurement positions may be set at prescribed intervals in the measurement direction from a center of the dent portion of the test piece for hardness measurement.

The test piece may be the same material as the cold worked component.

According to another aspect of the present disclosure in order to achieve the above object, there is provided a method for acquiring a hardness-equivalent plastic strain curve of a steel material including: preparing a test piece for hardness measurement having a dent portion of a shape corresponding to a shape of a contact surface of a punch; measuring hardnesses of the test piece for hardness measurement at a plurality of hardness measurement positions in a measurement direction while taking, as the measurement direction, a direction in the dent portion in which a sheet thickness changes; and performing numerical analysis to calculate equivalent plastic strains of the test piece for hardness measurement, and acquiring a hardness-equivalent plastic strain curve on the basis of the hardnesses and the equivalent plastic strains at the hardness measurement positions, wherein the test piece is mounted on a mounting base and the punch of which a contact surface to be in contact with the test piece is a curved surface, and compressing the test piece mounted on the mounting base using the punch.

Advantageous Effects of Invention

As described above, according to the present invention, a relationship between the hardness and the equivalent plastic strain of a material can be obtained by acquiring equivalent plastic strain for amounts of compression by one round of compression test.

DESCRIPTION OF EMBODIMENTS

Figure 1:
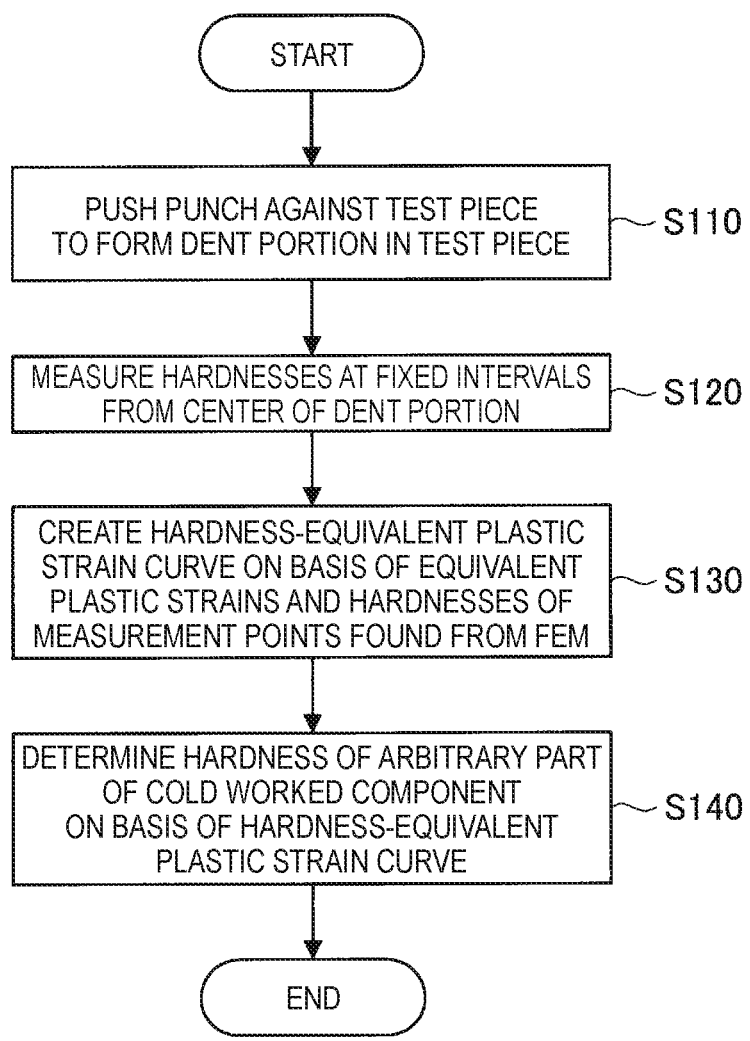
FIG. 1 is a flow chart showing a method for estimating a hardness of a cold worked component according to an embodiment of the present invention.

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

<1. Outline>

First, an outline of a method for estimating the hardness of a cold worked component according to an embodiment of the present invention is described. In the method for estimating the hardness of a cold worked component according to the present embodiment, first, one round of compression test is performed on one test piece, and a test piece for hardness measurement having a plastic strain distribution is created. Then, hardnesses of the created test piece for hardness measurement are measured at a plurality of hardness measurement positions, and a hardness-equivalent plastic strain curve is acquired on the basis of the measured hardnesses and equivalent plastic strains of the test piece for hardness measurement found by numerical calculation. Here, plastic strain is a vector quantity having magnitude and direction; in an orthogonal coordinate system, plastic strain is composed of six components of normal strains that are changes in length in an x-direction, a y-direction, and a z-direction and shear strains that are changes in angle in an xy plane, a yz plane, and a zx plane. In the present embodiment, hardness is predicted on the basis of a relationship between equivalent plastic strain, which is obtained by converting plastic strain to a scalar quantity of solely magnitude, and hardness. The hardness in an arbitrary place of a cold worked component can be estimated by performing numerical analysis to calculate a value of equivalent plastic strain of the cold worked component and using a hardness-equivalent plastic strain curve to specify a hardness corresponding to the equivalent plastic strain.

In the method for estimating the hardness of a cold worked component according to the present embodiment, a test piece for hardness measurement having a plastic strain distribution can be created easily by one round of compression test, and a hardness-equivalent plastic strain curve can be acquired from one test piece for hardness measurement. Further, the method for estimating the hardness of a cold worked component according to the present embodiment can be used even for a thin steel sheet because a plastic strain distribution is acquired from a flat sheet-like test piece, as described later. The method for estimating the hardness of a cold worked component according to the present embodiment will now be described in detail.

<2. Method for Estimating Hardness of Cold Worked Component>

The processing of a method for estimating the hardness of a cold worked component will now be described on the basis of the flow chart shown in FIG. 1, which shows a method for estimating the hardness of a cold worked component according to the present embodiment.

[2-1. Creation of Test Piece for Hardness Measurement]

In a method for estimating the hardness of a cold worked component according to the present embodiment, as shown in FIG. 1, first, a test piece for hardness measurement is created in order to acquire a hardness-equivalent plastic strain curve regarding the material of a cold worked component (S110). The test piece for hardness measurement is created by using a mounting base on which a test piece is mounted and a punch of which a contact surface to be in contact with the test piece is a curved surface and compressing a base material (a test piece) mounted on a test stand by means of the punch. The shape of the test piece is not particularly limited because numerical analysis on the test piece for hardness measurement can be performed when the shape of the test piece before compression is known. The test piece is preferably in a flat sheet-like shape with a planar shape of a rectangle in view of the ease of identification of the shape of the test piece, a case where the test piece for hardness measurement is created in a state where the test piece is restrained, etc. In the following, a description is given on the assumption that the test piece is in a flat sheet-like shape. Further, the material of the test piece is assumed to be the same as the material of a cold worked component of which the hardness is wanted to be estimated. For example, in the case where a steel sheet is subjected to cold working, a test piece is created from a steel sheet to be used for the working, that is, an identical steel sheet before the working.

Figure 2:
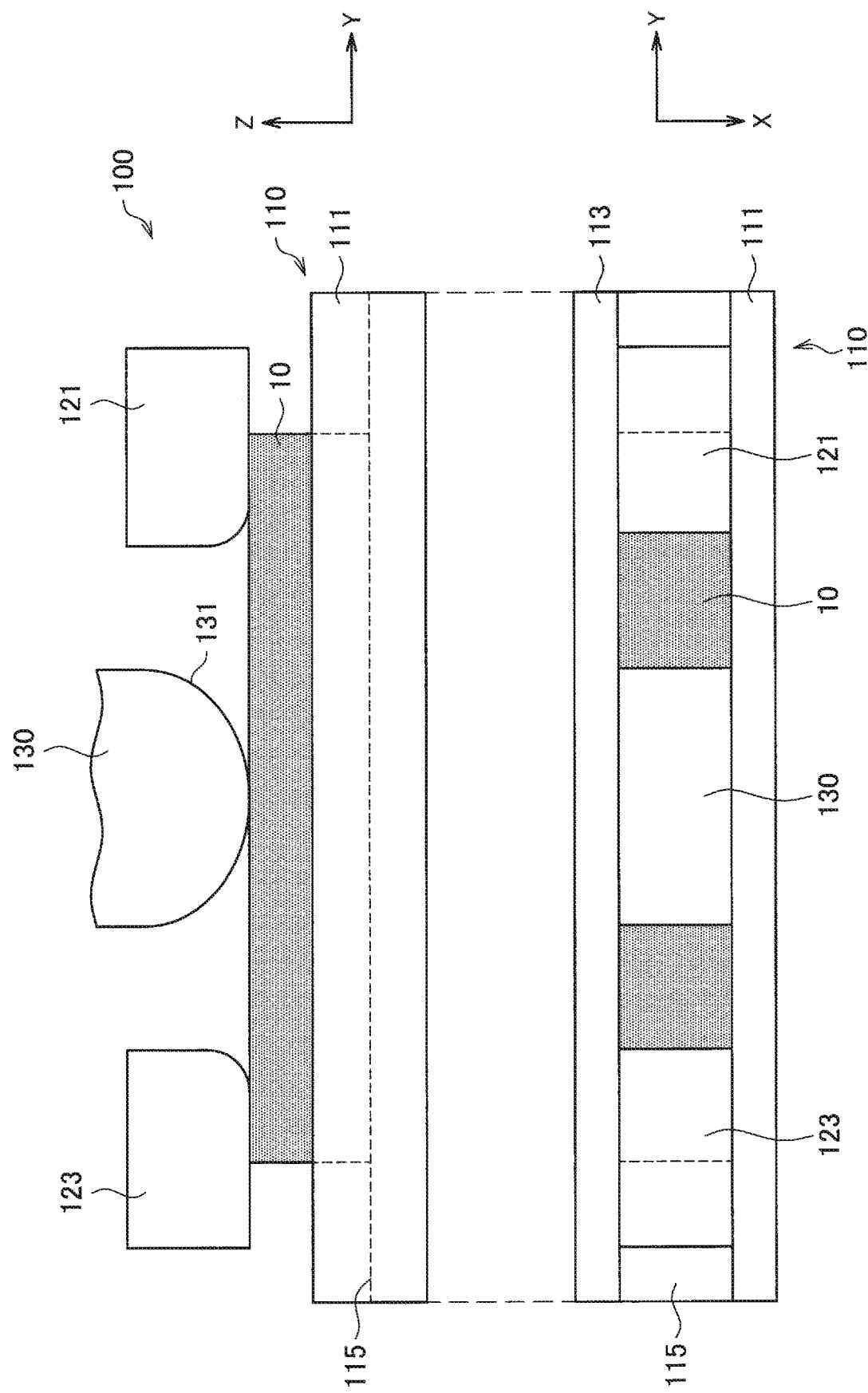
FIG. 2 is a schematic side view and a schematic plan view showing a configuration example of a jig for creating a test piece for hardness measurement according to the embodiment.

The test piece for hardness measurement is created by, for example, a jig 100 like that shown in FIG. 2. The jig 100 is composed of, as shown in FIG. 2, a die 110 on which a test piece 10 is mounted and that restrains the mounted test piece 10 in the sheet width direction (an X-direction), holding members 121 and 123 that hold, from above, the test piece 10 restrained by the die 110, and a punch 130 that presses the test piece 10 from above.

The die 110 is composed of a pair of wall portions 111 and 113 and a flat surface portion 115, and has a cross section of a substantially U-shaped form. The pair of wall portions 111 and 113 face each other with a spacing substantially equal to the sheet width of the test piece 10, and restrain the test piece 10 in the sheet width direction (the X-direction). The flat surface portion 115 exists between the pair of wall portions 111 and 113, and plays a role as a mounting base on which the test piece 10 is mounted. That is, the die 110 according to the present embodiment has a trench having a width substantially equal to the sheet width of the test piece 10 and extending in the longitudinal direction (a Y-direction). When the test piece 10 is placed along the trench, the sheet width direction of the test piece 10 is restrained by the die 110. Although a die 110 in which the pair of wall portions 111 and 113 for restraint in the sheet width direction of the test piece 10 and the flat surface portion 115 on which the test piece 10 is mounted are formed integrally is used in the jig 100 shown in FIG. 2, the configuration of the jig 100 for creating a test piece for hardness measurement is not limited to such an example.

The holding members 121 and 123 hold, from above, both ends in the longitudinal direction of the test piece 10 placed on the die 110. Both end portions of the test piece 10 are sandwiched and fixed in the sheet thickness direction (a Z-direction) by the flat surface portion 115 of the die 110 and the holding members 121 and 123. At this time, the die 110 and the holding members 121 and 123 are fixed by, for example, bolts (not illustrated) or the like in a state of sandwiching end portions of the test piece 10. By fixing the test piece 10 in the sheet thickness direction by means of the die 110 and the holding members 121 and 123, the occurrence of warpage in the test piece 10 at the time of being pressed by the punch 130 can be suppressed.

The punch 130 presses the test piece 10 placed on the die 110. In the punch 130, a contact surface 131 to be in contact with the test piece 10 is formed as a curved surface. For example, the punch 130 shown in FIG. 2 is formed as a substantially semicircular sheet-shaped member of which the contact surface 131 is formed of an outer peripheral surface with a radius of curvature of R and that has a width substantially equal to the sheet width of the test piece 10. The punch 130 presses the test piece 10 between the holding members 121 and 123 in a state of keeping the contact surface 131 facing the test piece 10 and associating the circumferential direction of the contact surface 131 and the longitudinal direction of the test piece 10 together. As a result, a test piece for hardness measurement 20 like that shown on the lower side of FIG. 3 that has a dent portion 21 corresponding to the shape of the contact surface 131 of the punch 130 is formed from a flat sheet-like test piece 10 like that shown on the upper side of FIG. 3.

Figure 3:
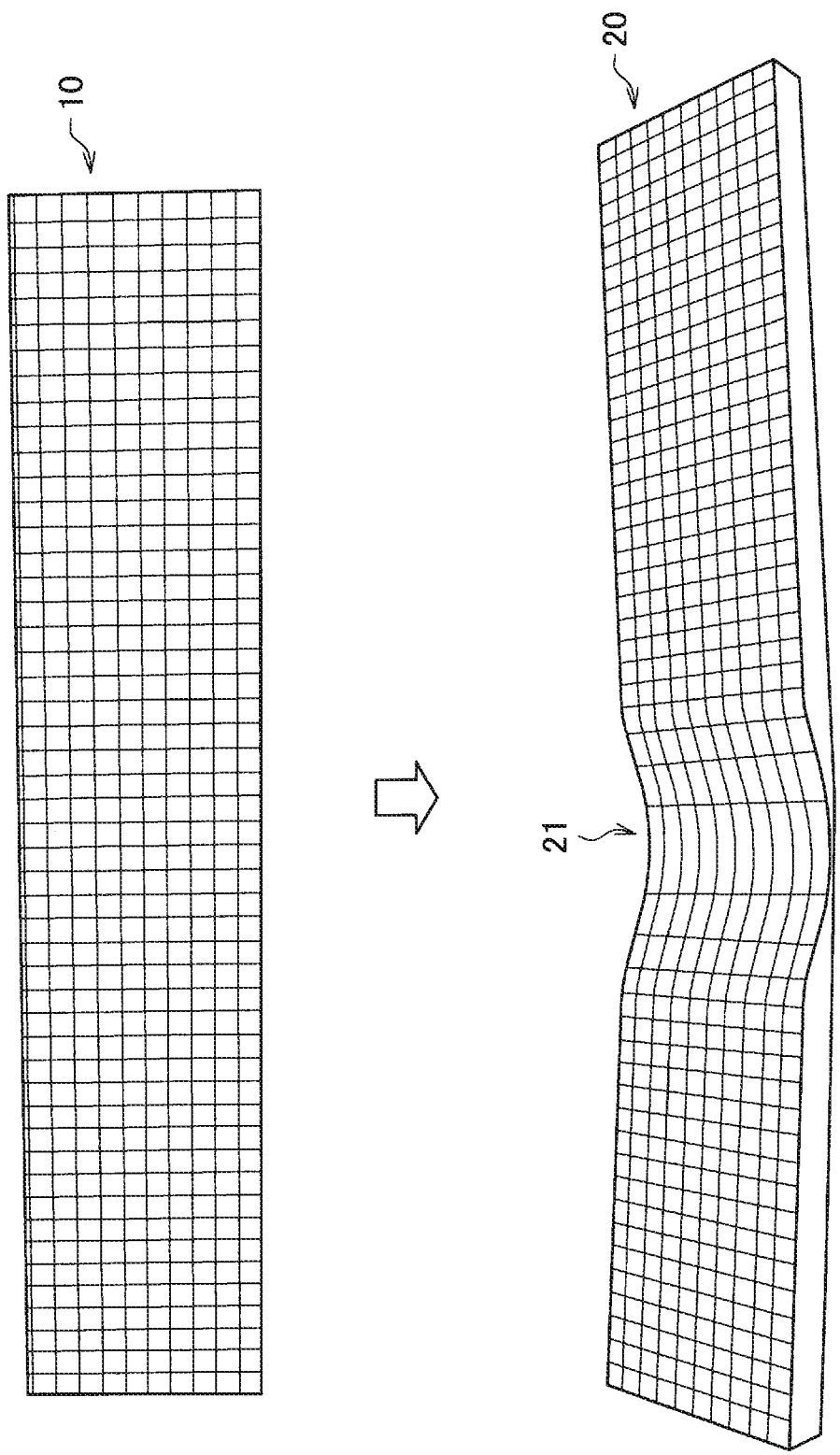
FIG. 3 is an explanatory diagram showing a test piece before pressing by a punch and the test piece after pressing by the punch (a test piece for hardness measurement). The present drawing is a conceptual diagram created on the basis of photographs.

In the case where a test piece for hardness measurement is created using the jig 100 shown in FIG. 2, the punch 130 having a width substantially equal to the sheet width of the test piece 10 is pushed against the test piece 10 in a state where the test piece 10 is restrained in the sheet width direction by the wall portions 111 and 113 of the die 110. The punch 130 gets into the trench of the die 110 and pushes the test piece 10, and forms the dent portion 21 in the test piece 10. By using such a jig 100 to form the dent portion 21 in the test piece 10, the test piece 10 does not deform in the sheet width direction when pushed by the punch 130, and the formed dent portion 21 can, as shown in FIG. 3, be a dent portion uniformly compressed in the sheet width direction. That is, a test piece for hardness measurement 20 provided with uniform plastic strain in the sheet width direction can be obtained. By creating such a test piece for hardness measurement 20, each time one round of hardness measurement described later is performed, a side surface may be ground to expose a surface not affected by the last round of hardness measurement; thus, hardness measurement can be performed again.

Figure 4:
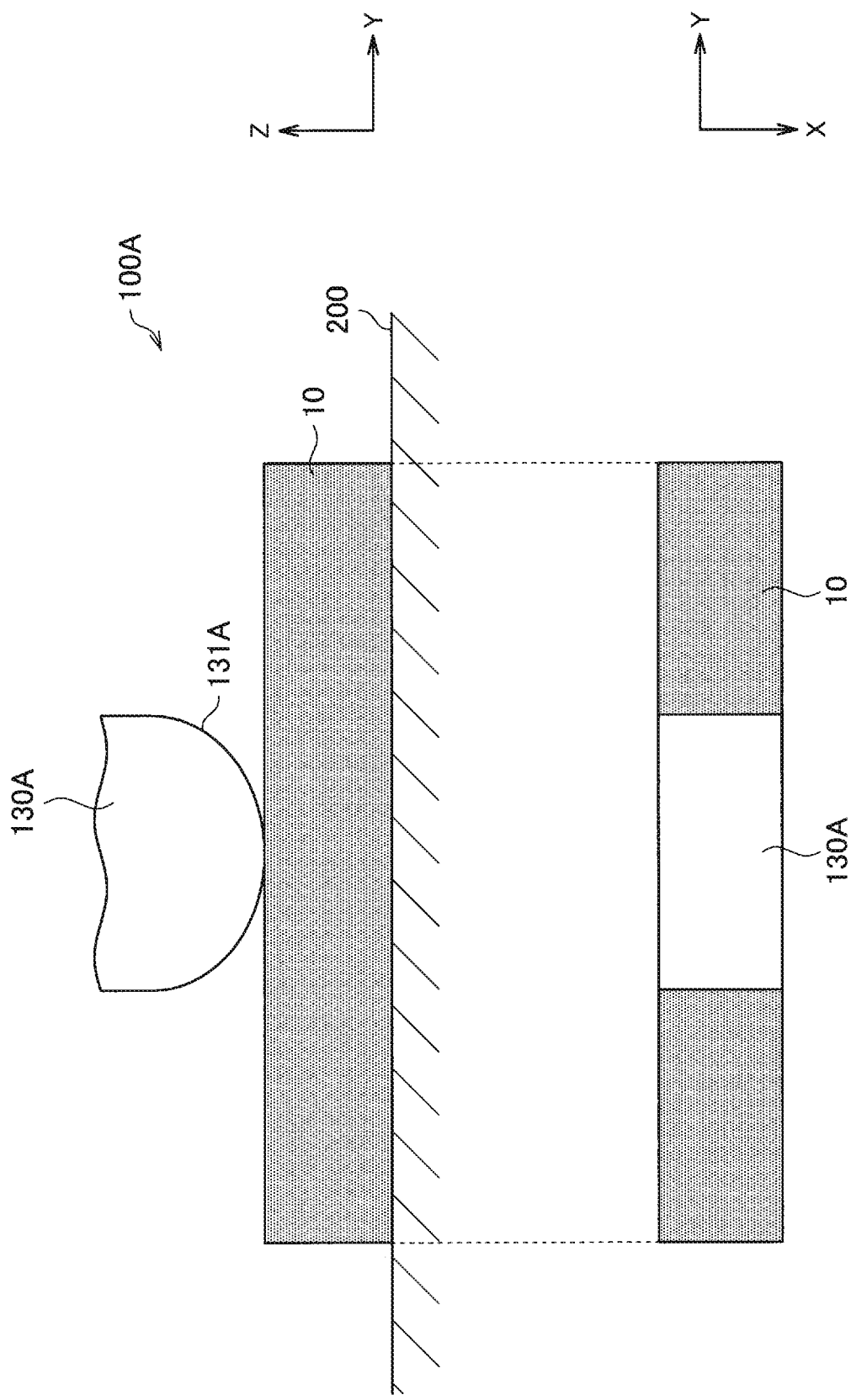
FIG. 4 is a schematic side view and a schematic plan view showing another configuration example of a jig for creating a test piece for hardness measurement according to the embodiment.

To create a test piece for hardness measurement, it is sufficient that there be a mounting base on which a test piece is mounted and a punch of which a contact surface to be in contact with the test piece is a curved surface. For example, as shown in FIG. 4, a jig 100A formed of a punch 130A that compresses the test piece 10 is used to push the test piece 10 mounted on a mounting base 200. For example, like in FIG. 2, the punch 130A may be formed as a substantially semicircular sheet-shaped member of which a contact surface 131A is formed of an outer peripheral surface with a radius of curvature of R and that has a width substantially equal to the sheet width of the test piece 10. It is sufficient that the mounting base 200 be so stable that the mounted test piece 10 does not deform even when pushed by the punch 130A.

In the case where a test piece for hardness measurement is created in this way, the test piece 10 is compressed by the punch 130A in a state where the sheet width direction is not restrained, and therefore the dent portion of the created test piece for hardness measurement slightly spreads in the sheet width direction. Further, since holding members that hold the test piece 10 from above are not used, the test piece 10 is not fixed in the sheet thickness direction, and warpage occurs in the test piece 10 when the test piece 10 is pressed by the punch 130A. However, even if such deformation occurs in the test piece for hardness measurement, numerical analysis on the test piece for hardness measurement can be performed when the shape of the test piece 10 before compression by the punch 130A is known. Thus, in the creation of a test piece for hardness measurement, it is not necessarily required to restrain the sheet width direction and the sheet thickness direction of the test piece 10 like in FIG. 2. As a matter of course, the test piece 10 mounted on the mounting base 200 may be compressed by the punch 130A in a state where either one of the sheet width direction and the sheet thickness direction of the test piece 10 is restrained.

Figure 5:
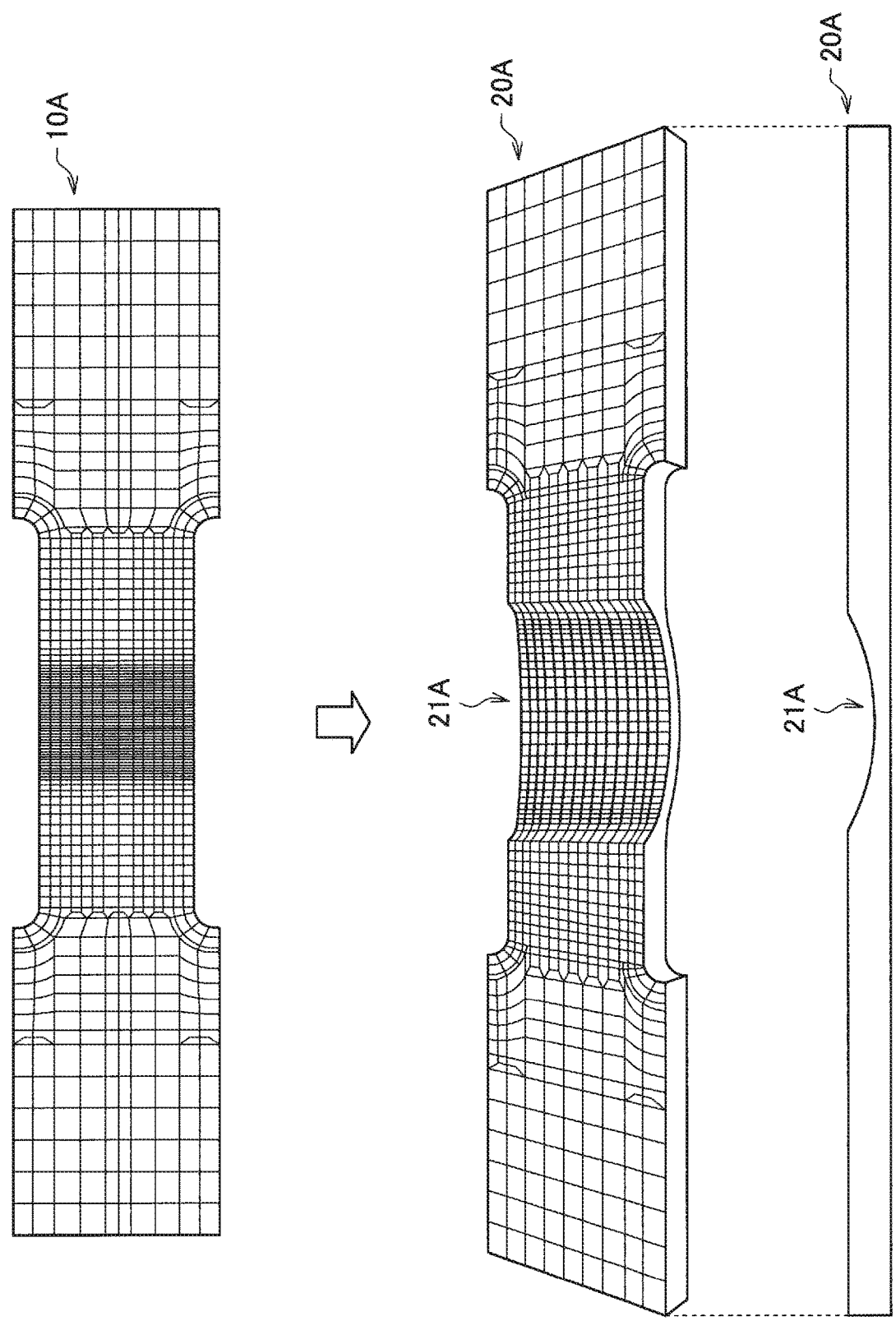
FIG. 5 is an explanatory diagram showing a test piece before pressing by a punch and the test piece after pressing by the punch (a test piece for hardness measurement) when the test piece for hardness measurement is created by the jig of FIG. 2 in a state where a sheet width direction of the test piece is not restrained. The present drawing is a conceptual diagram created on the basis of photographs.

FIG. 5 shows an example of a test piece for hardness measurement 20A that is formed by pushing the punch 130 into a test piece 10A in a state where the test piece 10A is mounted on the mounting base 200 and the sheet width direction is not restrained. The test piece for hardness measurement 20A shown in FIG. 5 is one created using the jig 100 shown in FIG. 2. In order to achieve a state where the sheet width direction of the test piece 10A is not restrained, in the test piece 10A of FIG. 5, the sheet width of a center region in the longitudinal direction where the punch 130 is pushed in (that is, a region where a dent portion 21A of the test piece for hardness measurement 20A can be formed) is set smaller than the sheet width of an end portion region. Thereby, when the test piece 10A is placed on the die 110, the center region in the longitudinal direction where the punch 130 is pushed in is prevented from coming into contact with the wall portion 111 or 113; thus, the punch 130 can be pushed into the test piece 10A in a state where the sheet width direction is not restrained. In the creation of the test piece for hardness measurement 20A shown in FIG. 5, also the holding members 121 and 123 were used.

When the test piece 10A is pushed in by the punch 130 without restraining the sheet width direction, a test piece for hardness measurement 20A like that shown on the lower side of FIG. 5 is created. The lower side of FIG. 5 shows a perspective view and a side view of the test piece for hardness measurement 20A. The test piece for hardness measurement 20A has a dent portion 21A of a shape corresponding to the shape of the contact surface 131 of the punch 130, and is provided with plastic strain in the longitudinal direction.

The plastic strain to be provided to the test piece for hardness measurement 20 or 20A can be set by the shape of the contact surface 131 of the punch 130 to be pressed against the test piece 10 or 10A. For example, the larger the radius of curvature R of the contact surface 131 of the punch 130 is set, the larger the resolution is, and the more finely the relationship between hardness and equivalent plastic strain can be obtained. When the radius of curvature R of the contact surface 131 of the punch 130 is larger, a larger load needs to be applied to the test piece 10 or 10A.

Although the punches 130 and 130A shown in FIG. 2 and FIG. 4 have shapes in which the contact surfaces 131 and 131A are formed of outer peripheral surfaces with a radius of curvature of R and that have widths substantially equal to the sheet widths of the test pieces 10 and 10A, respectively, the present invention is not limited to such examples. In the punches 130 and 130A, for example, the contact surfaces 131 and 131A may be spherical surfaces.

The processing of obtaining a hardness-equivalent plastic strain curve used for the estimation of the hardness of a cold worked component is performed using the test piece for hardness measurement 20 or 20A created in the above way. In the following, a case where a hardness-equivalent plastic strain curve is obtained using the test piece for hardness measurement 20 shown in FIG. 3 is described; however, similar processing may be performed also when other test pieces for hardness measurement, such as the test piece for hardness measurement 20A shown in FIG. 5, are used.

[2-2. Measurement of Hardness]

When obtaining a hardness-equivalent plastic strain curve, first, hardnesses of the test piece for hardness measurement 20 formed in step S110 are measured (S120). The test piece for hardness measurement 20 has a plastic strain distribution in the longitudinal direction. For example, the dent portion 21 pressed by the punch 130 is provided with such a high equivalent plastic strain as to exceed uniform elongation in a uniaxial tensile test. A portion of the test piece for hardness measurement 20 not pressed by the punch 130 is not provided with plastic strain, and is in the state of the base material with no strain as it is. That is, the test piece for hardness measurement 20 is provided with a plastic strain distribution from a strain region exceeding uniform elongation in a uniaxial tensile test to a region of the base material with no strain as it is. Here, uniform elongation in a uniaxial tensile test is in accordance with JIS Z 2241. Further, such an equivalent plastic strain as to exceed uniform elongation in a uniaxial tensile test is an equivalent plastic strain more than 1.0, for example.

In step S120, such a test piece for hardness measurement 20 is embedded in a resin, and hardnesses of the test piece for hardness measurement 20 are measured at a plurality of hardness measurement positions in a measurement direction while taking, as the measurement direction, an arbitrary direction in the dent portion 21 in which the sheet thickness changes. For example, the longitudinal direction of the test piece for hardness measurement 20 is taken as a measurement direction, and hardnesses are measured at prescribed intervals in the longitudinal direction from the center position of the dent portion 21 formed by pushing-in by the punch 130. The hardness can be measured by a Vickers hardness test of JIS Z 2244.

Figure 6:
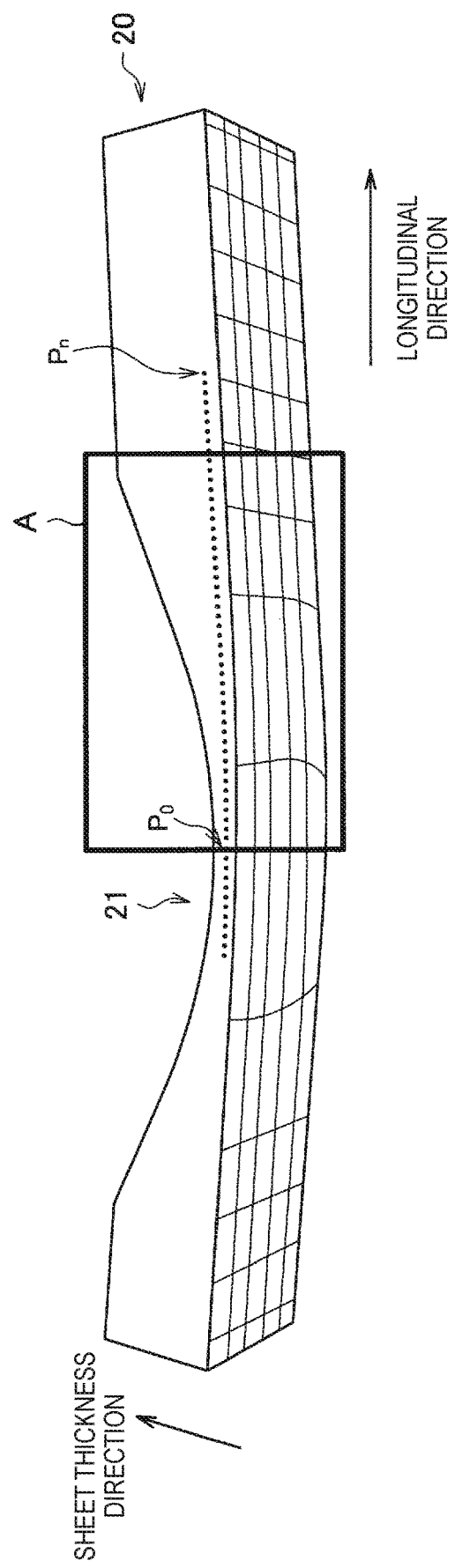
FIG. 6 is an explanatory diagram showing hardness measurement positions of a test piece for hardness measurement. The present drawing is a conceptual diagram created on the basis of a photograph.

FIG. 6 shows hardness measurement positions $P_n$ (n=0, 1, . . . , k) of the test piece for hardness measurement 20. Hardness measurement positions $P_n$ are set at prescribed equal intervals along the longitudinal direction of the test piece for hardness measurement 20. Hardness measurement position $P_0$ is the center of the dent portion 21 formed by pressing by the punch 130, and represents the position pressed by the punch 130 most. Hardnesses are measured at a plurality of hardness measurement positions $P_n$ in the longitudinal direction from the center of the dent portion 21 of such a test piece for hardness measurement 20 (hardness measurement position $P_0$), and thereby a hardness distribution in the longitudinal direction is acquired.

[2-3. Acquisition of Hardness-Equivalent Plastic Strain Curve]

When hardnesses of the test piece for hardness measurement 20 are measured by step S120, an equivalent plastic strain distribution is acquired by numerical analysis on the basis of the measured hardnesses; thus, a hardness-equivalent plastic strain curve is acquired on the basis of the equivalent plastic strain distribution (S130).

Figure 7:
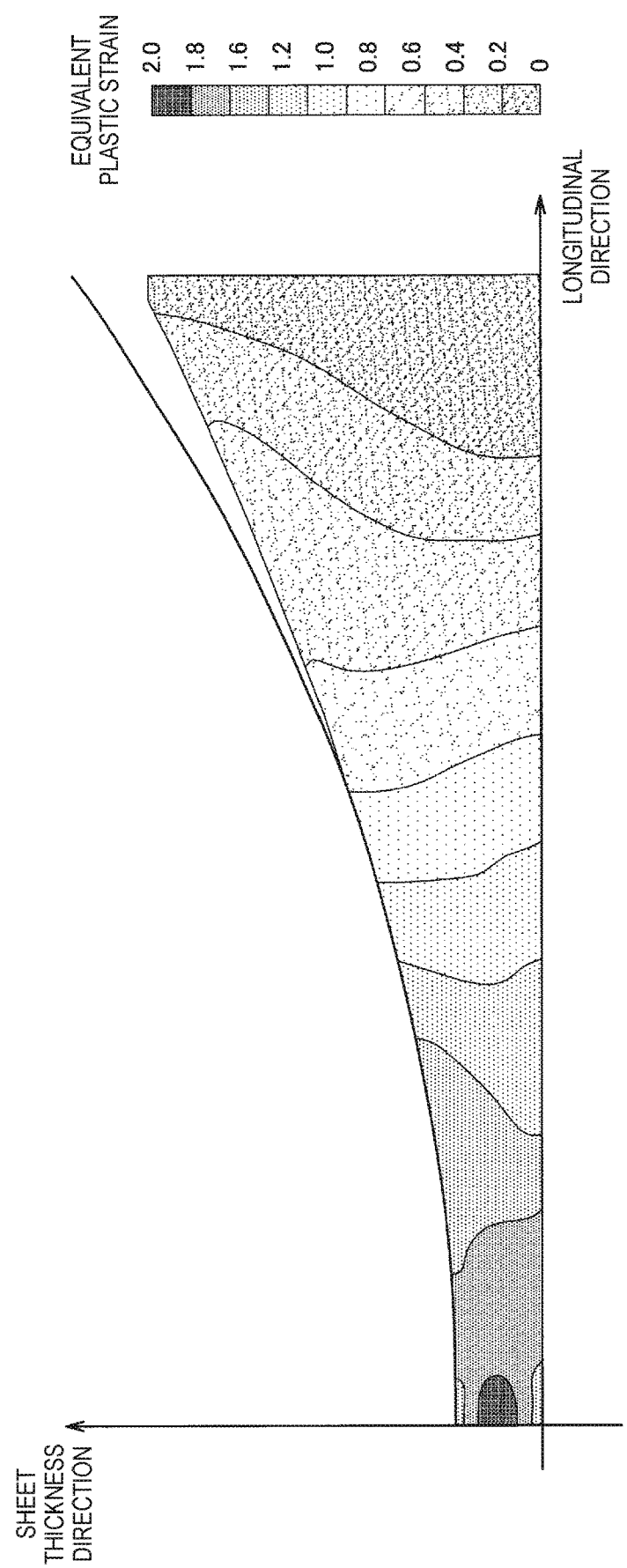
FIG. 7 is an explanatory diagram showing an equivalent plastic strain distribution in region A of FIG. 6.

Specifically, first, the equivalent plastic strain of each hardness measurement part $P_n$ is calculated by numerical analysis such as the finite element method (FEM), on the basis of the hardness distribution in the longitudinal direction of the test piece for hardness measurement 20 acquired in step S120. Thereby, an equivalent plastic strain distribution of the test piece for hardness measurement 20 is obtained. For example, an equivalent plastic strain distribution like that shown in FIG. 7 is obtained when, for example as shown in FIG. 6, an equivalent plastic strain distribution is calculated on the basis of hardnesses of region A from hardness measurement position $P_0$ to hardness measurement position $P_n$ where the sheet thickness is not changed from the sheet thickness of the base material. Then, the actual measurement values of hardness and the equivalent plastic strains at the hardness measurement positions are plotted; thus, a hardness-equivalent plastic strain curve is obtained.

In step 130, in the case where a test piece for hardness measurement created in a state where the sheet width direction is restrained, like the test piece for hardness measurement 20 shown in FIG. 3, is used, numerical analysis can be performed using a two-dimensional FEM, for example. On the other hand, in the case where a test piece for hardness measurement created in a state where the sheet width direction is not restrained, like the test piece for hardness measurement 20A shown in FIG. 5, is used, it is necessary to perform numerical analysis using a three-dimensional FEM, for example. Thus, the analysis time can be made shorter when a test piece for hardness measurement created in a state where the sheet width direction is restrained is used than when a test piece for hardness measurement created in a state where the sheet width direction is not restrained is used.

By the processing of steps S110 to S130 above, a hardness-equivalent plastic strain curve used to estimate the hardness of a cold worked component is acquired.

[2-4. Estimation of Hardness]

When a hardness-equivalent plastic strain curve is obtained by step S130, the hardness of a cold worked component can be estimated on the basis of such a hardness-equivalent plastic strain curve (S140). Specifically, first, a value of equivalent plastic strain of the cold worked component is calculated by numerical analysis such as the FEM.

Then, from the value of equivalent plastic strain of an arbitrary part of the cold worked component, the hardness is specified using the hardness-equivalent plastic strain curve obtained in step S130. In this way, the hardness in that part can be estimated.

<3. Conclusions>

Hereinabove, a method for estimating the hardness of a cold worked component according to the present embodiment is described. According to the present embodiment, a test piece is pressed using a mounting base on which the test piece is mounted and a punch of which a contact surface to be in contact with the test piece is a curved surface, and a test piece for hardness measurement is created. Thus, a test piece for hardness measurement can be created by providing a test piece with a plastic strain distribution by one round of compression test. Then, hardnesses of the test piece for hardness measurement are measured, and equivalent plastic strains for amounts of compression of the test piece for hardness measurement are calculated by numerical analysis; thus, a hardness-equivalent plastic strain curve that is a relationship between the hardness and the equivalent plastic strain of the material can be acquired easily. By using the acquired hardness-equivalent plastic strain curve, the hardness of an arbitrary part of a cold worked component can be estimated easily from an equivalent plastic strain distribution of the cold worked component obtained by numerical analysis.

For example, in a cold worked component of a complicated shape such as a gear, in order to estimate the hardness of an arbitrary part of the cold worked component, conventionally it has been necessary to perform a plurality of rounds of measurement of hardness and calculation of plastic strain while changing the amount of compression of a test piece. In contrast, when the method for estimating the hardness of a cold worked component according to the present embodiment is used, a hardness-equivalent plastic strain curve can be obtained by one round of compression test; thus, the hardness of an arbitrary part of a cold worked component can be estimated easily. Further, in a cold worked component based on sheet forging, the hardness is higher than in the material before the working, due to work hardening. Also in such a cold worked component, a relationship between such equivalent plastic strains as to exceed uniform elongation in a tensile test and hardnesses can be acquired when the method for estimating the hardness of a cold worked component according to the present embodiment is used. Thus, the hardness of an arbitrary part can be estimated easily also for a cold worked component based on sheet forging.

The sheet thickness of the test piece used in the method for estimating the hardness of a cold worked component according to the present embodiment is not particularly limited; for example, the method can be used even for a test piece of a thin steel sheet of less than or equal to 2 mm, and a hardness-equivalent plastic strain curve can be obtained by one round of compression test. The minimum value of the sheet thickness of the test piece is determined in accordance with the maximum load that can be provided to the test piece by a punch for creating a test piece for hardness measurement. If the test piece is too thin, a distribution of plastic strain may be difficult to identify; thus, a hardness-equivalent plastic strain curve with good accuracy can be obtained when the test piece has a certain thickness. Further, in the method for estimating the hardness of a cold worked component according to the present embodiment, a test piece can be provided with high strain without creating a test piece with a high aspect ratio, by squashing a thin steel sheet by using a punch having a contact surface of an arc-like peripheral surface or a spherical surface.

EXAMPLES

A hardness-equivalent plastic strain curve of a hot rolled steel sheet was acquired using the technique according to the present invention. For the acquisition of the hardness-equivalent plastic strain curve, first, a hot rolled steel sheet of a flat sheet-like shape with a sheet width of 20 mm, a sheet length of 100 mm, and a sheet thickness of 4 mm was used as a base material (a test piece), and the jig shown in FIG. 2 was used to compress a center portion of the test piece by means of a punch with an arc-shaped outer peripheral surface. The radius of curvature of the arc portion of the punch was 20 mm, and the width of the arc portion was 20 mm, which was equal to the sheet width of the test piece. In the present Example, a load of 24 tonf was applied to the test piece by the punch, and the test piece was compressed so that the sheet thickness of the most compressed position (that is, the center of the dent portion) might be 1 mm; thus, a test piece for hardness measurement was created.

Next, the test piece for hardness measurement was embedded in a resin, and subsequently hardnesses were measured at 0.3 mm intervals in the longitudinal direction from the center of the dent portion formed by being pressed by the punch. The measurement of hardness was performed on the basis of a Vickers hardness test of JIS Z 2244. In the present Example, three rounds of hardness measurement were performed on the one test piece for hardness measurement. At this time, each time one round of hardness measurement was performed, a side surface of the test piece for hardness measurement that has undergone hardness measurement was ground to expose a surface not affected by the last round of hardness measurement; then, the next round of hardness measurement was performed.

On the other hand, numerical analysis by the FEM was performed on the test piece for hardness measurement, and an equivalent plastic strain distribution of the test piece for hardness measurement was acquired. FIG. 7 is an equivalent plastic strain distribution of the test piece for hardness measurement obtained by numerical analysis.

Figure 8:
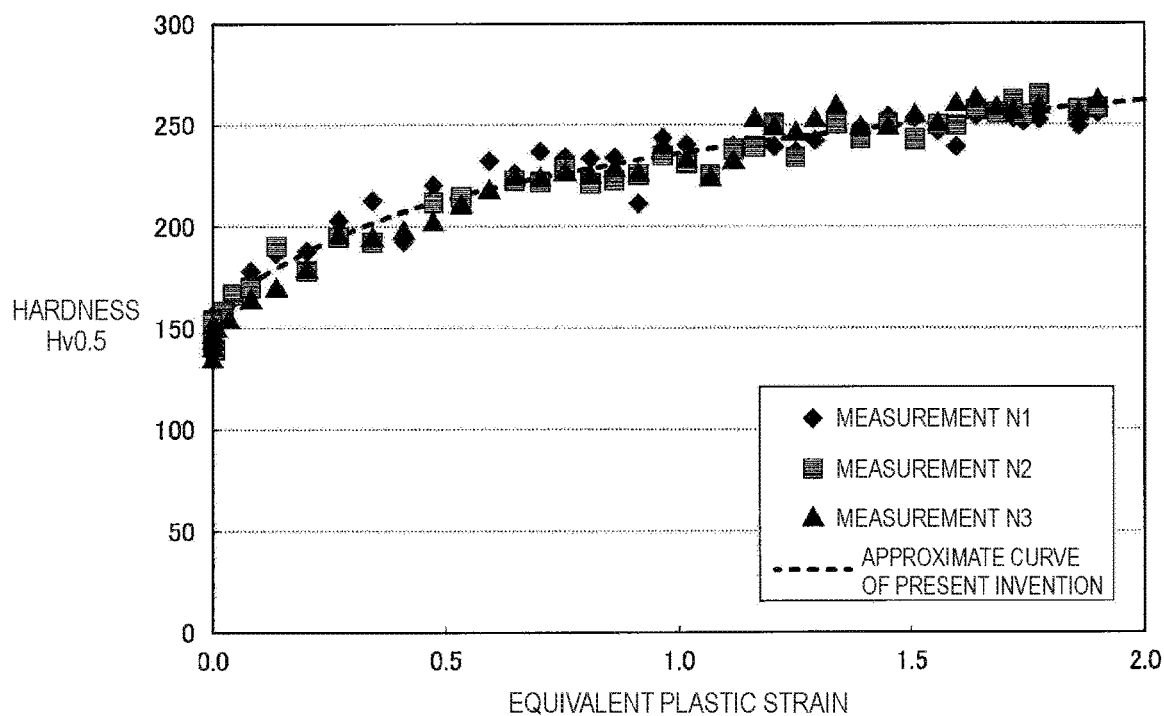
FIG. 8 is an explanatory diagram showing an Example of a hardness-equivalent plastic strain curve.

Then, the equivalent plastic strain in each hardness measurement position was specified using the actual measurement values of hardness of the test piece for hardness measurement and the equivalent plastic strain distribution of the test piece for hardness measurement shown in FIG. 7. The results of plotting of the hardnesses obtained by three rounds of hardness measurement (measurements N1 to N3) and the equivalent plastic strains specified by equivalent plastic strain distributions are shown in FIG. 8. As shown in FIG. 8, it can be seen that the plotted points are substantially on the same curve and there is a certain corresponding relationship between hardness and equivalent plastic strain. As shown by the broken line in FIG. 8, the hardness-equivalent plastic strain curve acquired by the technique of the present invention mentioned above can be obtained from the relationship between the hardnesses obtained by measurements N1 to N3 and the equivalent plastic strains by using, for example, the least squares method.

Figure 9:
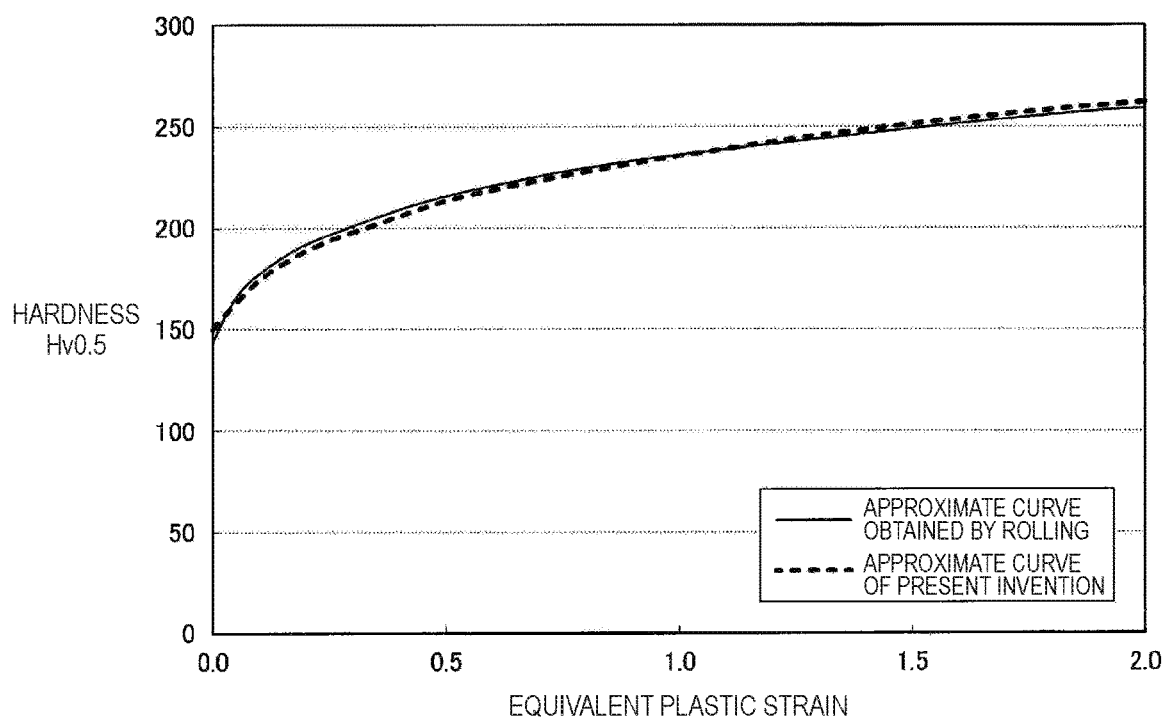
FIG. 9 is an explanatory diagram showing the hardness-equivalent plastic strain curve acquired in Example of FIG. 8 and a hardness-equivalent plastic strain approximate curve obtained by rolling.

Here, in order to verify the effectiveness of the relationship between hardness and equivalent plastic strain obtained by the present invention, the result of a hardness-equivalent plastic strain curve obtained by providing an identical test piece with plastic strain by rolling and the relationship between hardness and equivalent plastic strain mentioned above were compared. In FIG. 9, a hardness-equivalent plastic strain approximate curve obtained by rolling is shown by the solid line. As shown in FIG. 9, the hardness-equivalent plastic strain curve obtained by the technique of the present invention shown by the broken line is substantially equal to the hardness-equivalent plastic strain approximate curve obtained by rolling shown by the solid line. From this, it has been shown that a hardness-equivalent plastic strain curve can be acquired with good accuracy by the technique according to the present invention.

Further, a similar test was performed also on a test piece for hardness measurement like that shown in FIG. 5 that was created in a state where the sheet width direction was not restrained. That is, a hot rolled steel sheet of a flat sheet-like shape with a sheet width of 20 mm, a sheet length of 100 mm, and a sheet thickness of 4 mm was used as a base material (a test piece), and the jig shown in FIG. 2 was used to compress a center portion of the test piece by means of a punch with an arc-shaped outer peripheral surface. The sheet width of a center region in the longitudinal direction of the test piece was, as shown on the upper side of FIG. 5, set smaller than the sheet width (20 mm) of an end portion region in order to avoid contact with a wall portion of the die. The radius of curvature of the arc portion of the punch was 20 mm, and the width of the arc portion was 20 mm, which was equal to the sheet width of the test piece. A load of 24 tonf was applied to the test piece by the punch, and the test piece was compressed so that the sheet thickness of the center of the dent portion might be 1 mm; thus, a test piece for hardness measurement was created. Then, the test piece for hardness measurement was embedded in a resin, and subsequently hardnesses were measured at 0.3 mm intervals in the longitudinal direction from the center of the dent portion formed by being pressed by the punch.

As a result, it has been found that also the test piece for hardness measurement created in a state where the sheet width direction was not restrained has been provided with an equivalent plastic strain distribution like that shown in FIG. 7, similarly to the test piece for hardness measurement created while the sheet width direction was restrained. Also for the relationship between hardness and equivalent plastic strain, a similar relationship to FIG. 8 was obtained.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 10, 10A test piece
20, 20A test piece for hardness measurement
21, 21A dent portion
100, 100A jig
110 die
111, 113 wall portion
115 flat surface portion
121, 123 holding member
130, 130A punch
131, 131A outer peripheral surface
200 mounting base

The invention claimed is:

1. A method for estimating a hardness of a cold worked component comprising:
   preparing a test piece for hardness measurement having a dent portion of a shape corresponding to a shape of a contact surface of a punch by using a mounting base on which a test piece is mounted and the punch of which the contact surface to be in contact with the test piece is a curved surface, and compressing the test piece mounted on the mounting base using the punch;
   measuring hardnesses of the test piece for hardness measurement at a plurality of hardness measurement positions in a measurement direction while taking, as the measurement direction, a direction in the dent portion in which a sheet thickness changes;
   performing numerical analysis to calculate a plurality of equivalent plastic strains of the test piece for hardness measurement, and acquiring a hardness-equivalent plastic strain curve on the basis of the hardnesses and the plurality of equivalent plastic strains at the hardness measurement positions; and
   specifying a hardness from the calculated value of equivalent plastic strain of an arbitrary part of the cold worked component on the basis of the hardness-equivalent plastic strain curve by performing numerical analysis to calculate a value of equivalent plastic strain of a cold worked component.

2. The method for estimating a hardness of a cold worked component according to claim 1,
   wherein the test piece is in a flat sheet-like shape.

3. The method for estimating a hardness of a cold worked component according to claim 2,
   wherein the test piece for hardness measurement is created by compressing the test piece by means of the punch in a state where the test piece is restrained in a sheet width direction.

4. The method for estimating a hardness of a cold worked component according to claim 3,
   wherein the test piece for hardness measurement has a strain distribution including a strain region larger than uniform elongation obtained in a uniaxial tensile test.

5. The method for estimating a hardness of a cold worked component according to claim 2,
   wherein the test piece for hardness measurement has a strain distribution including a strain region larger than uniform elongation obtained in a uniaxial tensile test.

6. The method for estimating a hardness of a cold worked component according to claim 1,
   wherein the test piece for hardness measurement has a strain distribution including a strain region larger than uniform elongation obtained in a uniaxial tensile test.

7. The method for estimating a hardness of a cold worked component according to claim 1,
   wherein the test piece for hardness measurement has a strain distribution including a strain region where equivalent plastic strain is more than 1.0.

8. The method for estimating a hardness of a cold worked component according to claim 1,
   wherein the hardness measurement positions are set at prescribed intervals in the measurement direction from a center of the dent portion of the test piece for hardness measurement.

9. The method for estimating a hardness of a cold worked component according to claim 1,
   wherein the test piece is the same material as the cold worked component.

10. A method for acquiring a hardness-equivalent plastic strain curve of a steel material comprising:
preparing a test piece for hardness measurement having a dent portion of a shape corresponding to a shape of a contact surface of a punch;
measuring hardnesses of the test piece for hardness measurement at a plurality of hardness measurement positions in a measurement direction while taking, as the measurement direction, a direction in the dent portion in which a sheet thickness changes; and
performing numerical analysis to calculate equivalent plastic strains of the test piece for hardness measurement, and acquiring a hardness-equivalent plastic strain curve on the basis of the hardnesses and the equivalent plastic strains at the hardness measurement positions,
wherein the test piece is mounted on a mounting base and the punch of which a contact surface to be in contact with the test piece is a curved surface, and compressing the test piece mounted on the mounting base using the punch.

* * * * *